United States Patent [19]

Hostetler

[11] Patent Number: 4,656,970
[45] Date of Patent: Apr. 14, 1987

[54] POULTRY DRINKER DEVICE

[75] Inventor: Eldon Hostetler, Middlebury, Ind.

[73] Assignee: Ziggity Systems, Inc., Middlebury, Ind.

[21] Appl. No.: 694,235

[22] Filed: Jan. 24, 1985

[51] Int. Cl.⁴ ............................................. A01K 39/02
[52] U.S. Cl. ......................................... 119/75; 119/78
[58] Field of Search ........................ 119/78, 79, 80, 75

[56] References Cited

U.S. PATENT DOCUMENTS

| D. 150,917 | 3/1946 | Berg | D12/2 |
|---|---|---|---|
| D. 177,053 | 3/1956 | Kofford | D12/2 |
| D. 234,145 | 1/1975 | Peppler et al. | D30/3 |
| 1,086,785 | 2/1914 | Parkins | 119/78 |
| 1,103,413 | 7/1914 | Hasty | 119/78 |
| 1,259,253 | 3/1918 | McCullough | 119/74 |
| 1,928,103 | 2/1932 | Hill | 119/78 |
| 2,338,072 | 12/1943 | Quinn | 119/78 |
| 2,608,987 | 9/1952 | Collman | 137/123 |
| 2,700,370 | 1/1955 | Goff | 119/74 |
| 2,719,509 | 10/1955 | Kitson | 119/74 |
| 2,749,882 | 6/1956 | Butker | 119/74 |
| 2,771,058 | 11/1956 | Howard | 119/78 |
| 2,848,013 | 8/1958 | Kofford | 137/108 |
| 3,052,215 | 9/1962 | Shold | 119/78 |
| 3,145,729 | 8/1964 | Cordis | 137/414 |
| 3,306,262 | 2/1967 | Hart | 119/72 |
| 3,405,686 | 10/1968 | Hart | 119/75 |
| 3,862,621 | 1/1975 | Peppler et al. | 119/75 |
| 3,952,706 | 4/1976 | Hart | 119/75 |
| 4,221,188 | 9/1980 | Hostetler | 119/72 |

OTHER PUBLICATIONS

Ziggity Systems Inc. E-Z Sip Drinker Advertisement.

Primary Examiner—Hugh R. Chamblee
Attorney, Agent, or Firm—Barnes & Thornburg

[57] ABSTRACT

A drinker device for foul and stock provides a constant water supply in a cup by means of a valve controlled by a free floating ball actuator. The ball can be readily moved by the foul or animal to access the drinking water without actuating the valve controlling the water supply until the water level drops to an undesirable level. The device also provides convenient height adjustment mechanism and a quick unit replacement feature.

7 Claims, 3 Drawing Figures

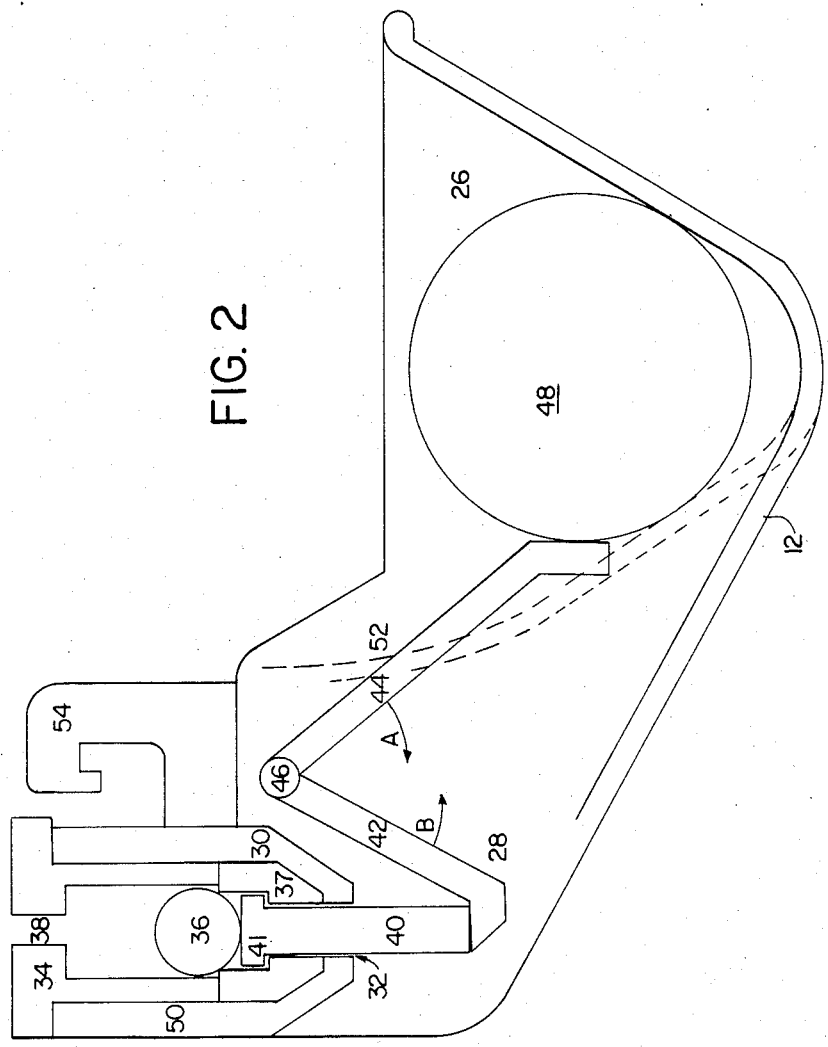

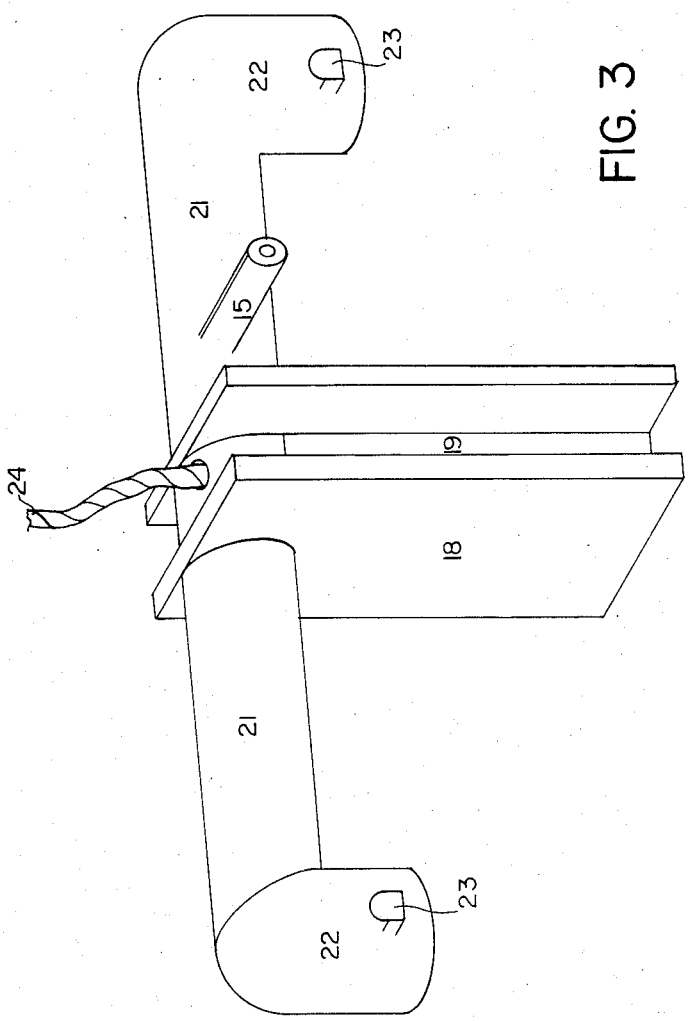

POULTRY DRINKER DEVICE

BACKGROUND AND SUMMARY OF THE INVENTION

The present invention relates generally to improvements in watering cups for poultry and animals and more specifically to improvements in watering cups which provide a constant water supply.

In the raising of poultry, it is necessary to provide the poultry with a constant supply of drinking water. Preferably, a device is provided wherein a liquid level is constantly maintained by a valve responsive to the quantity of water in the container to which the poultry has access. If the poultry is raised in individual cages, it is desirable to provide individual drinking cups in each cage such that the water level in each cup is constantly maintained above an undesirably low level.

A number of prior art poultry drinker devices have been provided wherein water levels are maintained in response to the water level present in a container from which the poultry drinks. Exemplary devices are disclosed in U.S. Pat. Nos. 1,928,103 to Hill, 2,608,987 to Collman, 2,771,058 to Howard and 3,052,215 to Shold. Each of these patents discloses a single float-controlled water supply means in the device for providing water to a plurality of animals. The devices are not readily adaptable to individual cages containing individual animals due to the relatively large size of the water container as necessitated by the large float means employed in each device. In each case, a float is provided integral with a lever arm which activates a water supply control valve. Such float means, if employed in a cup designed for an individual animal, would effectively occupy most of the water surface exposed in the cup. Attempts by the animal to displace the float for the purpose of gaining access to the water within the cup would activate the water supply means at times when such activation would be unnecessary and undesirable.

Additionally, it is undesirable to have one single float valve control the water supply system for a large number of animals. In the event of float valve malfunction, all poultry could be without water for a sustained time period. It is desirable that individual water supplies for each cage contain individual water level controls and that such individual units be readily and quickly replaceable in the event of malfunction.

Several prior art drinker units have employed valve trigger mechanisms which require activation by poultry or animals when water is needed by the animal. These devices necessitate the added undesirable process of training animals to activate the water supply device when water is needed.

Another problem not successfully addressed by prior art poultry drinkers is the need for convenient and quick height adjusting mechanisms which allow height adjustment from inside and/or outside a cage in response to poultry growth. Prior art devices attached to cage walls normally necessitate detachment, displacement and reattachment steps in response to poultry growth. Some such devices necessitate cutting additional holes in cages at various heights.

Accordingly, it is an object of the present invention to provide a float-actuated drinker device which constantly presents an adequate water supply for poultry.

Another object of the present invention is to provide an easily accessible water supply for individual animals.

Yet another object of the present invention is the provision of a watering device having a simple and compact construction.

Still another object of the present invention is the provision of a drinker unit which is especially adapted for use with existing wire cage enclosures and may be quickly replaced when such replacement is necessary.

A further object of the present invention is the provision of a drinker unit which allows easy access for poultry at various stages of development without time consuming repositioning of a drinker unit and without destruction of a cage wall.

These and other objects of the present invention are attained in the provision of a drinker cup in communication with a source of water. Water passes from the source into the cup through a tubular valve member contained in the cup. Valve members readily adapted for use in accordance with the present invention are described in U.S. Pat. Nos. 4,284,036 and 4,491,088. The discharge of water through the bore of the valve member is controlled by two interacting valve means. The first valve means comprises a ball which rests within the bore in a cup-shaped portion thereof. This ball effectively blocks passage of water from the source into the cup when in its seated position. A stem-like lower valve member capable of passing into the bore from beneath the ball and thereby dislodging the ball from its seated position comprises a second valve member. Movement of the stem member from a neutral downward position to a ball-dislodging upward position is caused by rotation of a pivotally mounted lever arm within the cup body. Rotational movement of the lever arm from a neutral position to a stem-engaging position is controlled by a free-floating ball within the cup. When the cup contains the desired amount of water, the ball is maintained in a free floating position, out of contact with the lever arm, due to buoyant forces exerted by the water upon the ball. When the water level in the cup reaches an undesirably low level, the force of gravity acting on the ball in the absence of a compensating buoyant force causes the ball to contact the lever arm. This contact with the lever arm causes the lever arm to engage the stem member, thereby dislodging the valve ball member from its seated position. While the ball is in this unseated position, the tubular member connecting the water source with the cup is no longer blocked and water may flow from the source into the cup. Water passes into the cup until sufficient water is contained in the cup to provide the buoyant force necessary to move the ball into a non-contact position relative to the lever arm. In this manner, water is allowed to pass into the cup in response to the drinking habits of the poultry. When the desired water level is present in the cup, the ball floats out of contact with the lever arm. The drinking animal can easily move the ball aside to obtain access to the water without contacting the lever arm and thereby without actuating the ball valve. When the desired water level is not present due to evaporation or drinking by the poultry, the float ball actuates the ball valve through rotation of the lever arm, thereby allowing water to flow into the cup.

In a particularly advantageous development, the drinker device is connected to a carriage. The carriage slidably engages a set of vertical tracks which permit vertical displacement of the carriage and the attached cup or cups. Upward vertical displacement of the cup can then take place in response to the growth and development of the poultry. The carriage supports the cup and is designed to provide for quick engagement or disengagement with the cup so as to facilitate drinker unit replacement. A design for quick engagement readily adaptable to the carriage and cup of the present invention is more fully described in U.S. Pat. Nos. 4,284,036 and 4,491,088. The carriage also contains a conduit system for supplying water from an external source to the cup.

Other objects, advantages and novel features of the present invention will become apparent from the following detailed description of the invention when considered in conjunction with the accompanying drawings.

BRIEF DESCRIPTION OF THE DRAWINGS

FIG. 2 is a partial sectional view of the cup portion of the drinker unit as shown in FIG. 1.

FIG. 3 is a perspective view of a carriage in accordance with the present invention.

DETAILED DESCRIPTION OF THE DRAWINGS

Figure 1:
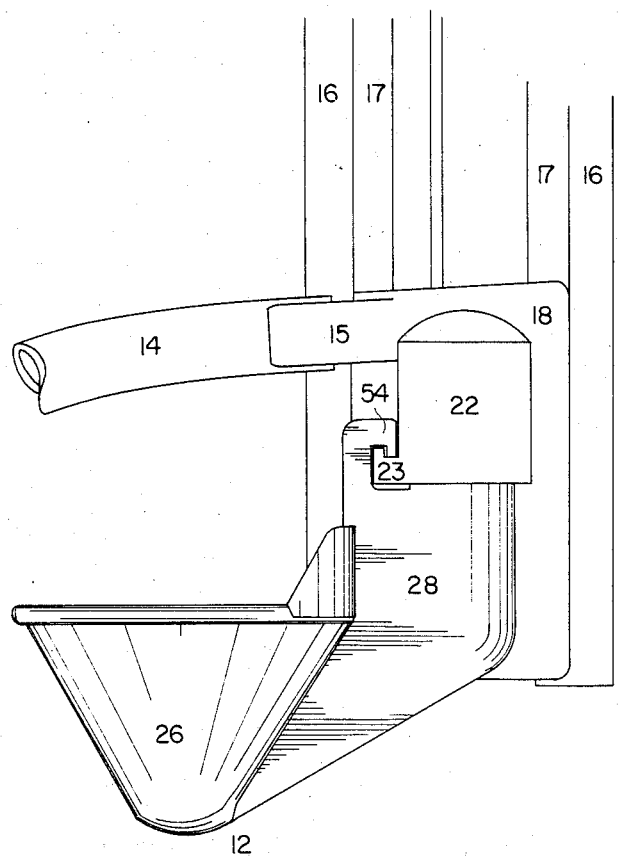
FIG. 1 is a perspective view of a drinker unit in accordance with the present invention.

FIG. 1 exhibits a perspective view of a drinker unit in accordance with the present invention. Drinker cup 12 is connected to water supply conduit 14 by means of coupling means 22 and 23 on carriage 18. Carriage 18 is integral with coupling means 22 and is slidably supported in vertical tracks 16. The slidable engagement of carriage 18 with vertical tracks 16 permits quick adjustment of the height of the drinker unit above ground level. Adjustment is even further facilitated by the use of cord 24 which connects slidable support bracket 16 to pulley means at a point above the drinker unit not shown in the drawing.

Referring now to FIG. 2, there is shown a partial sectional view of the cup portion of the drinker unit 12 depicted in FIG. 1. Cup 12 comprises trough region 26 in communication with valve-containing region 28. Valve-containing region 28 exhibits cup-shaped inlet region 30 having an inlet opening 32 leading into the interior of the cup 12. Seated within tapered inlet region 30 is valve ball 36. Tubular valve cover 34 having inlet opening 38 removably engages cup 12 in mouth portion 50.

Stem 40 extends through inlet opening 32 and exhibits a diameter smaller than that of opening 32. Stem 40 terminates at upper end in head portion 41 having a diameter greater than that of opening 32, thereby preventing stem 40 from falling completely through opening 32. Valve-containing region 28 supports horizontally disposed shaft 46 onto which a unitary valve activating arm comprising sections 42 and 44 is rotatably mounted. Floating ball 48 is freely disposed in trough region 26 of cup 12.

In operation, when trough portion 26 of cup 12 is filled to an appropriate level with water, the float ball 48 will be forced upward due to the buoyant force exerted by the water in the trough. The buoyant force prevents the ball 48 from contacting arm portion 44 of the rotatably disposed valve actuating member. Under these circumstances, the weight of valve ball 36 will exert a downward force on the head portion 41 of stem 40, thereby allowing ball 36 to be seated in cup-shaped inlet region 30 or in resilient washer means 37 contained therein, thereby effectively sealing opening 32. A water source in communication with inlet opening 38 of tubular valve cover 34 is thereby prevented from supplying additional water to the trough region 26 of the cup 12.

When an animal wishes to drink from the trough 26 of the cup 12, it simply moves the free floating ball 48 aside to obtain access to the water. Under the influence of the buoyant force of the water, the floating ball will be prevented from contacting arm 44 and opening 32 will remain sealed. When the water supply in cup 12 has been depleted to a point where insufficient water is present to supply a buoyant force capable of maintaining the floating ball in a position out of contact with valve activating arm portion 44, the floating ball will exert a force against arm portion 44. This in turn causes rotation of arm portion 44 and arm portion 42 which together comprise a unitary valve-actuating member in direction A, about horizontal shaft 46. The rotational movement of arm portion 42 about shaft 46 in direction A exerts an upward force on valve stem 40 which contacts valve ball 36. This upward force dislodges valve ball 36 from its seated position within inlet region 30. Valve ball 36, when in its seated position, effectively obstructs the flow of water from an external water supply through opening 38 and opening 32 into the cup interior. When the valve ball is dislodged due to upward movement of stem 40, the flow of water from an external source through opening 38 and into the cup through opening 32 is no longer obstructed. Accordingly, the trough region 26 of cup 12 fills with water until sufficient water is present to exert a buoyant force against the float ball 48 capable of maintaining the ball in a position out of contact with the valve actuator arm portion 44. When the floating ball 48 is maintained in a non-contact position with arm portion 44, the valve actuator comprising unitary arm portions 42 and 44 will naturally rotate in direction B about horizontal shaft 46. Rotation in direction B may be limited by providing an appropriately positioned abutting surface such as surface 52 on the interior of cup 12 in the valve containing region 28. Arm portions 42 and 44 of the valve actuating means may be naturally biased for rotation in direction B by designing arm portions 42 and 44 with an appropriate moment which will cause rotation in direction B. Alternatively, the gravitational force exerted by valve ball 36 upon stem 40 may provide the required force to cause rotation of arms 42 and 44 in direction B. Any suitable biasing means may be employed for the purpose of biasing the valve actuating means in direction B, thereby allowing valve ball 36 to become seated once again in inlet region 30 in a position which effectively obstructs the flow of water from an external source into the cup. The sealing ability of valve ball 36 may be augmented in any desired manner such as by employing a resilient washer means 37 within the inlet region 30 which permits effective sealing between the wall of inlet region 30 and the surface of valve ball 36.

FIG. 3 is a perspective view of a carriage according to the present invention. Support panel 18 contains grooves 19 on both front and back portions. Extending laterally from panel 18 are hollow arm portions 21 culminating in integral coupling elements 22. Nipple means 15 extends from one arm portion 21 and interlock means 23 extend from each coupling element 22. Cord means 24 is attached to the carriage at a point on support panel 18.

In operation, support panel 18 slidably engages tracks 16 shown in FIG. 1. Tongue elements 17 fit within grooves 19 on support panel 18 and provide for slidable engagement between the support panel 18 and tracks 16. Cord 24 may be attached to pulley means at a point above a poultry cage for the purpose of facilitating vertical displacement of the carriage within the tracks.

With reference to FIG. 1, cup interlocking member 54 is rotatably engaged with carriage interlocking member 23 after insertion of cup mouth region 50 into carriage coupling element 22 with a positive fit. The positive fit allows alignment and sealing between an outlet orifice located in coupling element 22, not shown, and inlet orifice 38 of cup 12.

An external source of water is conveniently attached to nipple 15 as shown in FIG. 1 of the drawings. Water passes from external water supply 14 through nipple 15, hollow arm portion 21 and coupling element 22. The water flow is then stopped until the ball valve of the drinker unit is actuated due to an inadequate water supply within the trough region 26 of cup 12. When the ball valve is actuated, water flows from the external water supply 14 to the cup 12 until the ball valve is closed due to the presence of the appropriate water level in the cup 12.

As shown in FIG. 3, the carriage can readily be adapted to provide height-adjustable support and water supplies to more than one drinker unit at the same time. Of course, if a single drinker unit is to be used with a carriage, one arm and coupling portion 21 and 22 may be eliminated in accordance with the present invention.

As can be seen in FIG. 1, the drinker unit of the present invention has a simple and compact construction. The slide assembly may be readily adapted for use with an existing wire poultry cage such as, for example, at the interface between two adjacent poultry cages sharing a wire wall. Once the slide is installed in the interface, repositioning of the drinker unit level in response to poultry growth may be performed in a simple and time efficient manner by simply applying an upward force to cord 24. This upward force will cause the carriage support panel 18 to move upward on vertical tracks 16. Using the appropriate length for cord 24, the adjustment can be done conveniently from outside the poultry cage.

Additionally, the device of the present invention by means of coupling element 22 and interlocking members 54 of the cup and 23 of the carriage provides for quick replacement of an individual cup when such replacement is necessary due to cup malfunction.

As can be seen from FIG. 2, the drinker unit of the present invention constantly presents an adequate water supply for poultry. This water supply is easily accessible by the animal by simple lateral movement of a free floating ball. Refilling of a cup having an inadequate water supply requires no trigger activation by the animal and therefore no training of animals to activate such triggers. In accordance with the present invention, activation of the water supply occurs automatically when the water level is dissipated due to drinking or evaporation.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A drinker assembly comprising:
   cup means,
   valve means adjacent said cup means and having an outlet above a maximum water fill line of the cup means, said valve means being biased to a closed position to prevent a flow of water into said cup means,
   valve-actuating lever means pivotable about a pivot point attached to said cup means for opening said valve means to cause water to flow into the cup means up to its normal fill line, said lever means comprising a first lever leg extending from said pivot point to said vlave means and a second lever leg extending from said pivot point into said cup means below the normal water fill line, and
   free floating buoyant float means, said float means normally freely floating in the cup means and being floatingly displaceable aroung the cup means to provide unfettered access to the water in the cup means without causing pivoting of the valve-actuating lever means and being capable of causing pivoting of said valve-actuating lever means by contacting said second lever leg only when the water level in said cup falls below the normal fill line to a predetermined level, said pivoting causing said first lever leg of said valve-actuating means to open said valve means to provide for filling.

2. The drinker assembly according to claim 1 wherein the second lever leg is considerably longer in length than the first lever leg to obtain favorable force multiplication for valve actuation by the buoyant float means.

3. A drinker device according to claim 1, wherin said buoyant float is a sphere.

4. A drinker assembly according to claim 1, further comprising:
   vertical track means, and
   carriage means slidably engageable with said vertical track means, said cup means being detachably engageable with said carriage means.

5. A drinker assembly according to claim 4, wherein said carriage and said cup have complementary interlocking hook means for connecting said carriage with said cup.

6. A poultry watering cup for use in poultry cages, comprising:
   a water retaining cup portion;
   a valve housing portion spaced apart from and connected to said cup portion;
   said housing portion including an inlet, an outlet and a valve chamber connected therebetween;
   said valve chamber including a ball valve element and an actuating pin therein for controlling water flow to said cup portion, said actuating pin including a lower portion extending through said outlet;
   said outlet being disposed in said housing portion at a location above the highest water retaining level of said cup portion;
   an actuation lever moveably mounted at a pivot point between said cup portion and said housing portion;
   said actuation lever having first and second arm means, said first arm means extending from said pivot point to a position adjacent said lower portion of said actuating pin, and said second arm means extending from said pivot point to a lower region of said cup portion;
   a float ball disposed within said cup portion, said ball being freely displaceable within the said cup portion so as to avoid interference with poultry access to water therein, and said ball being sufficiently buoyant so as to be removed from actuating contact with said second arm means unless the water present in said cup portion falls below a predetermined level;

said actuating lever and said ball being operably associated such that said ball engages said second arm means with actuating contact when the water present in said cup portion falls below said predetermined level, said actuating contact causing said second arm means to move about said pivot point such that said first arm means engages said actuating pin to initiate water flow to said cup portion.

7. The poultry watering cup according to claim 6, wherein said watering cup is connectable to a water supply line by means of a pair of releasable, rotationally interlocked mating hooks, one hook member of each pair being mounted on said watering cup and the other hook member being mounted on said supply line.

* * * * *

UNITED STATES PATENT AND TRADEMARK OFFICE
CERTIFICATE OF CORRECTION

PATENT NO. : 4,656,970

DATED : April 14, 1987

INVENTOR(S) : Eldon Hostetler

It is certified that error appears in the above-identified patent and that said Letters Patent is hereby corrected as shown below:

In Column 6, line 11, please delete "vlave" and insert therefor --valve--.

In Column 6, line 16, please delete "aroung" and insert therefor --around--.

In Column 6, line 31, please delete "wherin" and insert therefor --wherein--.

Signed and Sealed this

Tenth Day of November, 1987

Attest:

DONALD J. QUIGG

Attesting Officer

Commissioner of Patents and Trademarks